United States Patent
Davis

(10) Patent No.: US 10,588,308 B1
(45) Date of Patent: Mar. 17, 2020

(54) EASY CAP INSECTICIDE SPRAY SYSTEM

(71) Applicant: Wayne L. Davis, St. Petersburg, FL (US)

(72) Inventor: Wayne L. Davis, St. Petersburg, FL (US)

( * ) Notice: Subject to any disclaimer, the term of this patent is extended or adjusted under 35 U.S.C. 154(b) by 1843 days.

(21) Appl. No.: 13/963,515

(22) Filed: Aug. 9, 2013

Related U.S. Application Data

(60) Provisional application No. 61/744,402, filed on Sep. 24, 2012.

(51) Int. Cl.
*A01M 1/20* (2006.01)
*B65D 83/20* (2006.01)
*B65D 83/38* (2006.01)

(52) U.S. Cl.
CPC ......... *A01M 1/2038* (2013.01); *B65D 83/206* (2013.01); *B65D 83/208* (2013.01); *B65D 83/388* (2013.01)

(58) Field of Classification Search
CPC .. B65D 83/203; B65D 83/206; B65D 83/208; B65D 83/388; B05B 15/628; B05B 15/62; A01M 1/2038
USPC ...................................................... 222/174
See application file for complete search history.

(56) References Cited

U.S. PATENT DOCUMENTS

| | | | | |
|---|---|---|---|---|
| 277,555 A * | 5/1883 | Erlenborn | ............... | A47K 5/13 222/166 |
| 299,096 A * | 5/1884 | Winter | ............. | B05C 17/00546 222/113 |
| 2,591,716 A * | 4/1952 | Murphy | ................. | A01G 23/12 47/12 |
| 3,013,699 A * | 12/1961 | Meuwly | ............... | B65D 83/203 222/174 |
| 3,017,056 A * | 1/1962 | Bishop | ................. | B65D 83/208 222/164 |
| 3,039,657 A * | 6/1962 | Meuwly | ............... | B65D 83/208 222/174 |
| 3,069,095 A * | 12/1962 | Bishop | ................. | B65D 83/208 239/280.5 |
| 3,110,426 A * | 11/1963 | Bishop | ................. | B65D 83/208 222/505 |
| 3,220,613 A * | 11/1965 | Palmer | ................. | B65D 83/208 222/174 |
| 3,229,858 A * | 1/1966 | Lesh | .................... | B65D 83/203 222/174 |
| 3,229,859 A * | 1/1966 | Conroy | ................ | B65D 83/203 222/174 |
| 3,473,700 A * | 10/1969 | Batistelli | ............ | A47L 11/4075 222/174 |

(Continued)

*Primary Examiner* — Patrick M. Buechner

(57) ABSTRACT

An upper assembly has a housing adapted to receive a spray can of the type including a button with an exhaust port. The upper assembly has a lateral opening, an upper support arm is secured to and extends laterally from the housing, and a lower support arm. An actuating lever has an interior end pivotably coupled to the housing adjacent to the lateral opening, an exterior end formed with an upper aperture, and a central extent located above the button. A lower assembly has a cylindrical support and a trigger. The trigger has a pivot end rotatably coupled to the cylindrical support, a free end adapted to be depressed to rotate the pivot end of the trigger, a lower aperture adjacent to the pivot end, and a spring between the cylindrical support and the free end of the trigger.

4 Claims, 2 Drawing Sheets

(56) References Cited

U.S. PATENT DOCUMENTS

| | | | | | |
|---|---|---|---|---|---|
| 3,485,206 A * | 12/1969 | Smrt | ............................ | E01C 23/227 | 118/305 |
| 3,510,028 A * | 5/1970 | Nello | ............................ | B65D 83/203 | 222/174 |
| 3,679,319 A * | 7/1972 | Munchel | ............................ | A47L 1/08 | 401/138 |
| 3,716,195 A * | 2/1973 | Silva | ............................ | B65D 83/203 | 239/375 |
| 3,794,217 A * | 2/1974 | Munchel | ............................ | B05B 11/3052 | 222/174 |
| 3,856,209 A * | 12/1974 | Hickson | ............................ | B65D 83/203 | 239/532 |
| 3,915,382 A * | 10/1975 | Davis | ............................ | B05B 15/628 | 239/195 |
| 4,023,711 A * | 5/1977 | Sena | ............................ | B05B 15/628 | 222/174 |
| 4,089,440 A * | 5/1978 | Lee | ............................ | B65D 83/202 | 222/174 |
| 6,322,006 B1 * | 11/2001 | Guo | ............................ | B05B 15/628 | 239/532 |
| 6,450,423 B1 * | 9/2002 | Gurule | ............................ | B65D 83/203 | 222/174 |
| 7,048,151 B1 * | 5/2006 | Wertz | ............................ | B05B 15/628 | 222/174 |
| 7,252,210 B1 * | 8/2007 | Schultz | ............................ | B65D 83/203 | 222/174 |
| 8,029,206 B2 * | 10/2011 | McCarthy | ............................ | B65D 83/208 | 222/174 |
| 8,444,020 B1 * | 5/2013 | Kenny | ............................ | B65D 83/203 | 222/162 |
| 2004/0094577 A1 * | 5/2004 | Drew | ............................ | B65D 83/203 | 222/174 |
| 2005/0199653 A1 * | 9/2005 | Warner | ............................ | B65D 83/203 | 222/174 |
| 2005/0279767 A1 * | 12/2005 | Kenny | ............................ | B65D 83/202 | 222/174 |
| 2006/0255067 A1 * | 11/2006 | Guiseppe | ............................ | B65D 83/203 | 222/174 |
| 2009/0026223 A1 * | 1/2009 | Knebler | ............................ | B65D 83/202 | 222/174 |

\* cited by examiner

US 10,588,308 B1

EASY CAP INSECTICIDE SPRAY SYSTEM

RELATED APPLICATION

The present application is based upon provisional Application No. 61/744,402 filed Sep. 24, 2012, the subject matter of which is incorporated herein by reference.

BACKGROUND OF THE INVENTION

Field of the Invention

The present invention relates to an easy cap insecticide spray system and more particularly pertains to positioning a spray can of insecticide at an elevated orientation and dispensing the insecticide onto insects to be exterminated in a safe, convenient and economical manner.

Description of the Prior Art

The use of insecticide spray systems of known designs and configurations is known in the prior art. More specifically, insecticide spray systems of known designs and configurations previously devised and utilized for the purpose of exterminating insects at an elevated orientation are known to consist basically of familiar, expected, and obvious structural configurations, notwithstanding the myriad of designs encompassed by the crowded prior art which has been developed for the fulfillment of countless objectives and requirements.

While these devices fulfill their respective, particular objectives and requirements, they do not describe an easy cap insecticide spray system that allows positioning a spray can of insecticide at an elevated orientation and dispensing the insecticide onto insects.

In this respect, the easy cap insecticide spray system according to the present invention substantially departs from the conventional concepts and designs of the prior art, and in doing so provides an apparatus primarily developed for the purpose of positioning a spray can of insecticide at an elevated orientation and dispensing the insecticide onto insects. Therefore, it can be appreciated that there exists a continuing need for a new and improved easy cap insecticide spray system which can be used for for positioning a spray can of insecticide at an elevated orientation and for dispensing the insecticide onto insects to be exterminated, the positioning and the dispensing being done in a safe, convenient and economical manner. In this regard, the present invention substantially fulfills this need.

SUMMARY OF THE INVENTION

In view of the foregoing disadvantages inherent in the known types of insecticide spray systems of known designs and configurations now present in the prior art, the present invention provides an improved easy cap insecticide spray system. As such, the general purpose of the present invention, which will be described subsequently in greater detail, is to provide a new and improved easy cap insecticide spray system and method which has all the advantages of the prior art and none of the disadvantages.

To attain this, the present invention essentially comprises An upper assembly has a housing adapted to receive a spray can of the type including a button with an exhaust port. The upper assembly has a lateral opening, an upper support arm is secured to and extends laterally from the housing, and a lower support arm. An actuating lever has an interior end pivotably coupled to the housing adjacent to the lateral opening, an exterior end formed with an upper aperture, and a central extent located above the button. A lower assembly has a cylindrical support and a trigger. The trigger has a pivot end rotatably coupled to the cylindrical support, a free end adapted to be depressed to rotate the pivot end of the trigger, a lower aperture adjacent to the pivot end, and a spring between the cylindrical support and the free end of the trigger.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved easy cap insecticide spray system which has all of the advantages of the prior art insecticide spray systems of known designs and configurations and none of the disadvantages.

It is another object of the present invention to provide a new and improved easy cap insecticide spray system which may be easily and efficiently manufactured and marketed.

It is further object of the present invention to provide a new and improved easy cap insecticide spray system which is of durable and reliable constructions.

An even further object of the present invention is to provide a new and improved easy cap insecticide spray system which is susceptible of a low cost of manufacture with regard to both materials and labor, and which accordingly is then susceptible of low prices of sale to the consuming public, thereby making such easy cap insecticide spray system economically available to the buying public.

Lastly, another object of the present invention is to provide an easy cap insecticide spray system for positioning a spray can of insecticide at an elevated orientation and for dispensing the insecticide onto insects to be exterminated, the positioning and the dispensing being done in a safe, convenient and economical manner.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
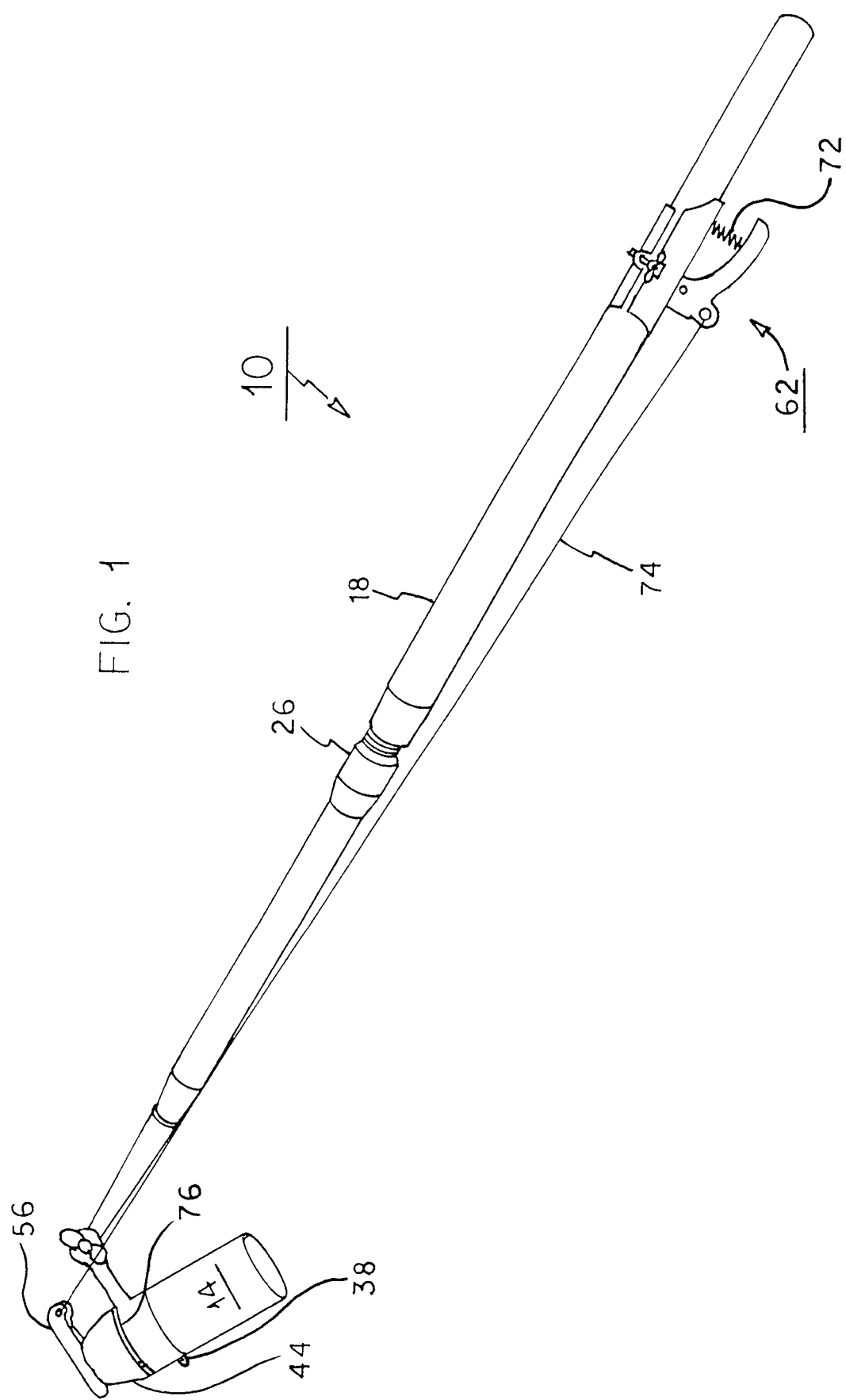
FIG. 1 is a perspective illustration of an easy cap insecticide spray system constructed in accordance with the principles of the present invention.
Figure 2:
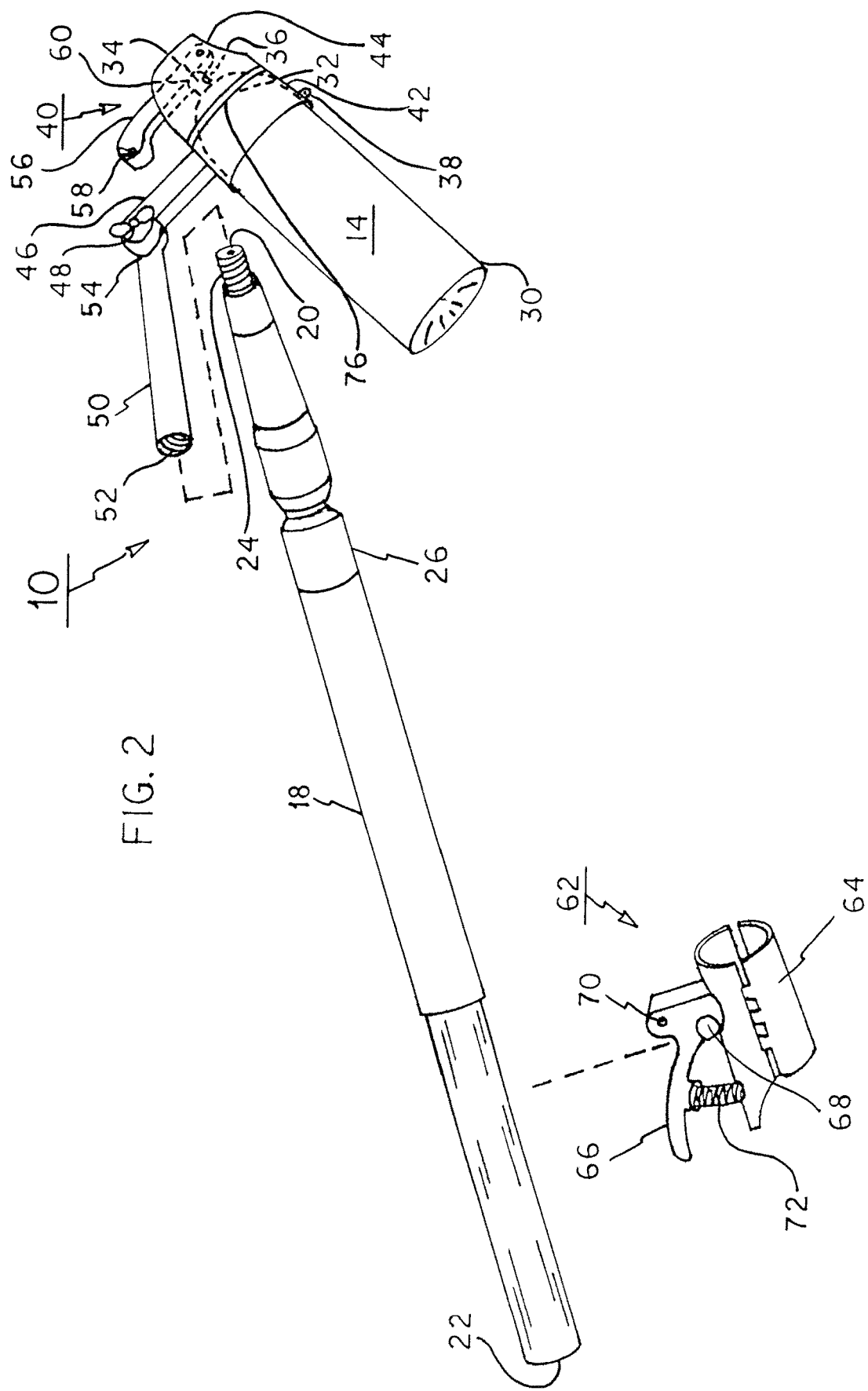
FIG. 2 is an enlarged exploded perspective illustration of the system shown in FIG. 1.

With reference now to the drawings, and in particular to FIG. 1 thereof, the preferred embodiment of the new and improved easy cap insecticide spray system embodying the principles and concepts of the present invention and generally designated by the reference numeral 10 will be described.

The present invention, the easy cap insecticide spray system 10 is comprised of a plurality of components. Such components in their broadest context include an upper assembly with a housing and a lower assembly with a cylindrical support. Such components are individually configured and correlated with respect to each other so as to attain the desired objective.

The easy cap insecticide spray system 10 of the present invention is for positioning a spray can 14 of insecticide at an elevated orientation and for dispensing the elevated insecticide onto insects to be exterminated. The positioning and the dispensing are done in a safe, convenient and economical manner.

First provided is an extensible pole 18. The extensible pole has an upper end 20 and a lower end 22 and a central extent there between. The upper and lower ends are mutually movable axially with respect to each other to increase and decrease the length of the pole. Male screw threads are formed in the pole at the upper end. The central extent has a rotatable section 26. The rotatable section is rotatable in a first direction to allow a user to vary the length of the pole. The rotatable section is rotatable in a second direction to allow a user to fix the length of the pole.

A spray can 14 is next provided. The spray can has a lower extent 30 in a cylindrical configuration containing an insecticide. The spray can has an upper extent 32 with a dispensing button 34 formed with an exhaust port 36.

Next provided is an upper assembly 40. The upper assembly has a generally cylindrical housing 42 with an open lower end adapted to frictionally receive and support the upper extent of the spray can including the dispensing button and the exhaust port. The upper assembly also has an upper tab 38 with a threaded fastener and wing nut for the secure coupling of the upper assembly to the extensible pole adjacent to the upper end of the extensible pole. The upper assembly has a lateral opening 44 for the passage of the insecticide from the exhaust port toward insects to be exterminated.

The upper assembly also has an upper support arm 46 with a first end secured to and extending laterally from the housing at a location diametrically opposite from the lateral opening. The upper support arm has a second end with a diametric hole 48.

The upper assembly also has a lower support arm 50. The lower support arm has a first end with a threaded axial opening 52 adapted to threadedly couple with the upper end of the extensible pole. The lower support arm has a second end with a diametric hole 54.

The upper assembly also has a threaded fastener extending through the diametric holes of the upper and lower support arms.

A wing nut threadedly receives the threaded fastener to adjustably secure the upper and lower support arms at a desired angle for directing the spray of insecticide appropriately.

The upper assembly has an actuation lever 56. The actuating lever has an interior end pivotably coupled to the housing adjacent to the lateral opening. The actuating lever has an exterior end formed with an upper aperture 58 above the threaded fastener and rotationally offset therefrom. The actuating lever has a central extent formed with a downwardly extending cylindrical contactor 60 located above the dispensing button adapted to depress the dispensing button when the exterior end of the actuating lever is lowered to dispense the insecticide. The central extent and contactor are adapted to release the dispensing button when the exterior end of the actuating lever is released to terminate dispensing of the insecticide.

Next provided is a lower assembly 62. The lower assembly has a cylindrical support 64 removably received on the extensible pole adjacent to the lower end. The lower assembly has a trigger. The trigger has a pivot end 68 rotatably coupled to the cylindrical support. The trigger has a free end 66 adapted to be depressed to rotate the trigger. The trigger has a lower aperture 70 adjacent to the pivot end. The trigger has a coil spring 72 between the cylindrical support and the free end of the trigger. A lower tab 76 with a threaded fastener and a wing nut is provided for the secure coupling of the lower assembly to the extensible pole adjacent to the lower end of the extensible pole.

Lastly, a string 74 is provided. The string has a lower end in the lower aperture 70 of the trigger. The string having an upper end in the upper aperture 58 of the actuating lever. In this manner squeezing the trigger will pull the string and pivot the actuating lever to depress the dispensing button and dispense the insecticide and release of the trigger will terminate the dispensing of the insecticide.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A spray system comprising:
   an upper assembly having a housing adapted to receive a spray can, the spray can including a button with an exhaust port, the upper assembly having a lateral opening, an upper support arm secured to and extending laterally from the housing, a lower support arm, an actuating lever having an interior end pivotably coupled to the housing adjacent to the lateral opening and an exterior end formed with an upper aperture, the actuating lever having a central extent located above the button; and
   a lower assembly having a cylindrical support, the lower assembly having a trigger, the trigger having a pivot end rotatably coupled to the cylindrical support, the trigger having a free end adapted to be depressed to rotate the pivot end of the trigger, a lower aperture in the trigger adjacent to the pivot end, the trigger having a spring between the cylindrical support and the free end of the trigger.

2. The system as set forth in claim 1 and further including:
   an extensible pole having an upper end and a lower end and a central extent there between, the upper and lower ends being mutually movable axially with respect to each other to increase and decrease the length of the pole, male screw threads formed in the pole at the upper end, the central extent having a rotatable section, the rotatable section being rotatable in a first direction to allow a user to vary the length of the pole, the rotatable section being rotatable in a second direction to allow a user to fix the length of the pole.

3. The system as set forth in claim 1 and further including:
   a string having a lower end in the lower aperture, the string having an upper end in the upper aperture whereby squeezing the trigger will pull the string and pivot the actuating lever to depress the button and dispense an insecticide while release of the trigger will terminate the dispensing of the insecticide.

4. An easy cap insecticide spray system (10) for positioning a spray can (14) of insecticide at an elevated orientation and for dispensing the elevated insecticide onto insects to be exterminated, the system comprising, in combination:
   an extensible pole (18) having an upper end (20) and a lower end (22) and a central extent there between, the upper and lower ends being mutually movable axially with respect to each other to increase and decrease the length of the extensible pole, male screw threads formed in the extensible pole at the upper end, the central extent having a rotatable section (26), the rotatable section being rotatable in a first direction to allow a user to vary the length of the extensible pole, the rotatable section being rotatable in a second direction to allow a user to fix the length of the extensible pole;
   a spray can (14) having a lower extent (30) in a cylindrical configuration containing an insecticide, the spray can having an upper extent (32) with a dispensing button (34) formed with an exhaust port (36);
   an upper assembly (40) having a housing (42) in a cylindrical configuration with an open lower end adapted to frictionally receive and support the upper extent of the spray can including the dispensing button and the exhaust port, an upper tab (38) with a threaded fastener and wing nut for coupling of the upper assembly to the extensible pole adjacent to the upper end of the extensible pole, the upper assembly having a lateral opening (44) for the passage of the insecticide from the exhaust port toward the insects to be exterminated, an upper support arm (46) having a first end secured to and extending laterally from the housing at a location diametrically opposite from the lateral opening, the upper support arm having a second end with a diametric hole (48), a lower support arm (50) having a first end with a threaded axial opening (52) adapted to threadedly couple with the upper end of the extensible pole, the lower support arm having a second end with a diametric hole (54), a threaded fastener extending through the diametric holes (48)(54) of the upper and lower support arms, a wing nut threadedly receiving the threaded fastener to adjustably secure the upper and lower support arms at a desired angle for directing the spray of insecticide appropriately, an actuating lever (56) having an interior end pivotably coupled to the housing adjacent to the lateral opening, the actuating lever having an exterior end formed with an upper aperture (58) above the threaded fastener and rotationally offset therefrom, the actuating lever having a central extent formed with a downwardly extending cylindrical contactor (60) located above the button adapted to depress the dispensing button when the exterior end of the actuating lever is lowered to dispense the insecticide, the central extent and contactor adapted to release the dispensing button when the exterior end of the actuating lever is released to terminate dispensing of the insecticide;
   a lower assembly (62) having a cylindrical support (64) removably received on the pole adjacent to the lower end, the lower assembly having a trigger, the trigger having a pivot end (68) rotatably coupled to the cylindrical support, the trigger having a free end (66) adapted to be depressed to rotate the trigger, the trigger having a lower aperture (70) adjacent to the pivot end, the trigger having a coil spring (72) between the cylindrical support and the free end of the trigger, a lower tab (76) with a threaded fastener and wing nut for coupling of the lower assembly to the extensible pole adjacent to the lower end; and
   a string (74) having a lower end in the lower aperture (70) of the trigger, the string having an upper end in the upper aperture (58) of the actuating lever whereby squeezing the trigger will pull the string and pivot the actuating lever to depress the dispensing button and dispense the insecticide and release of the trigger will terminate the dispensing of the insecticide.

\* \* \* \* \*